Dec. 1, 1925.  1,563,614
A. EKMAN
SIGNAL DEVICE
Filed Jan. 20, 1922  5 Sheets-Sheet 3
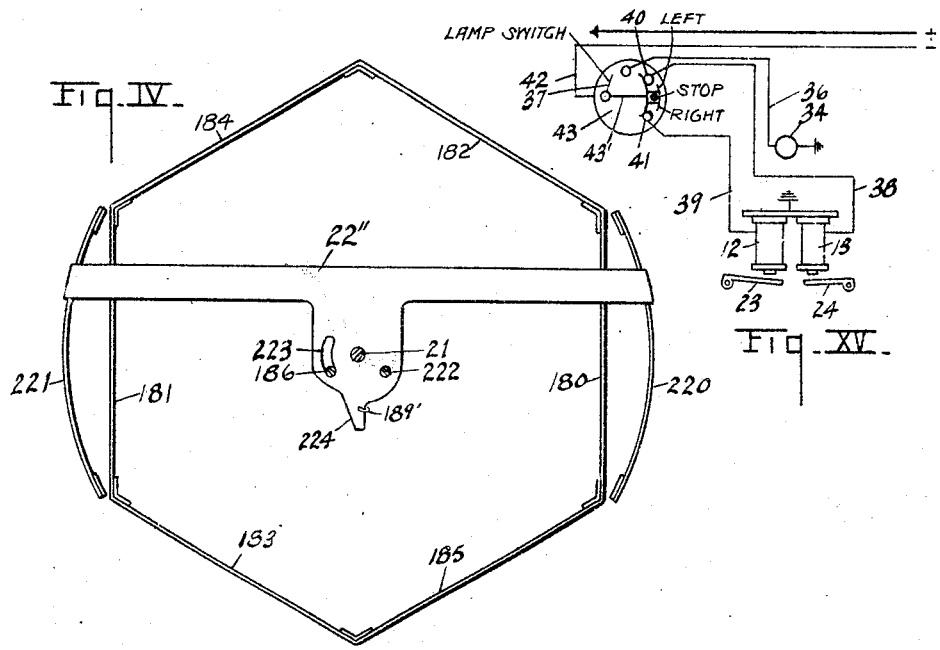
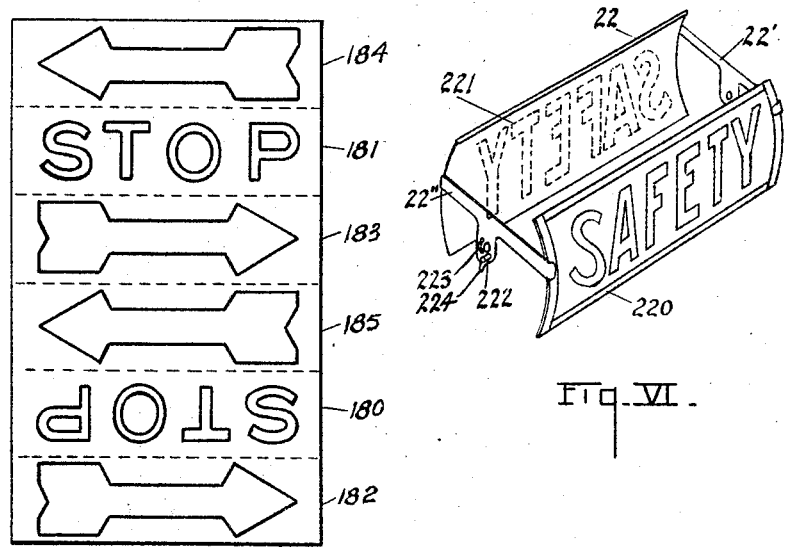
INVENTOR.
Andrew Ekman.
BY Chappell Earl
ATTORNEYS

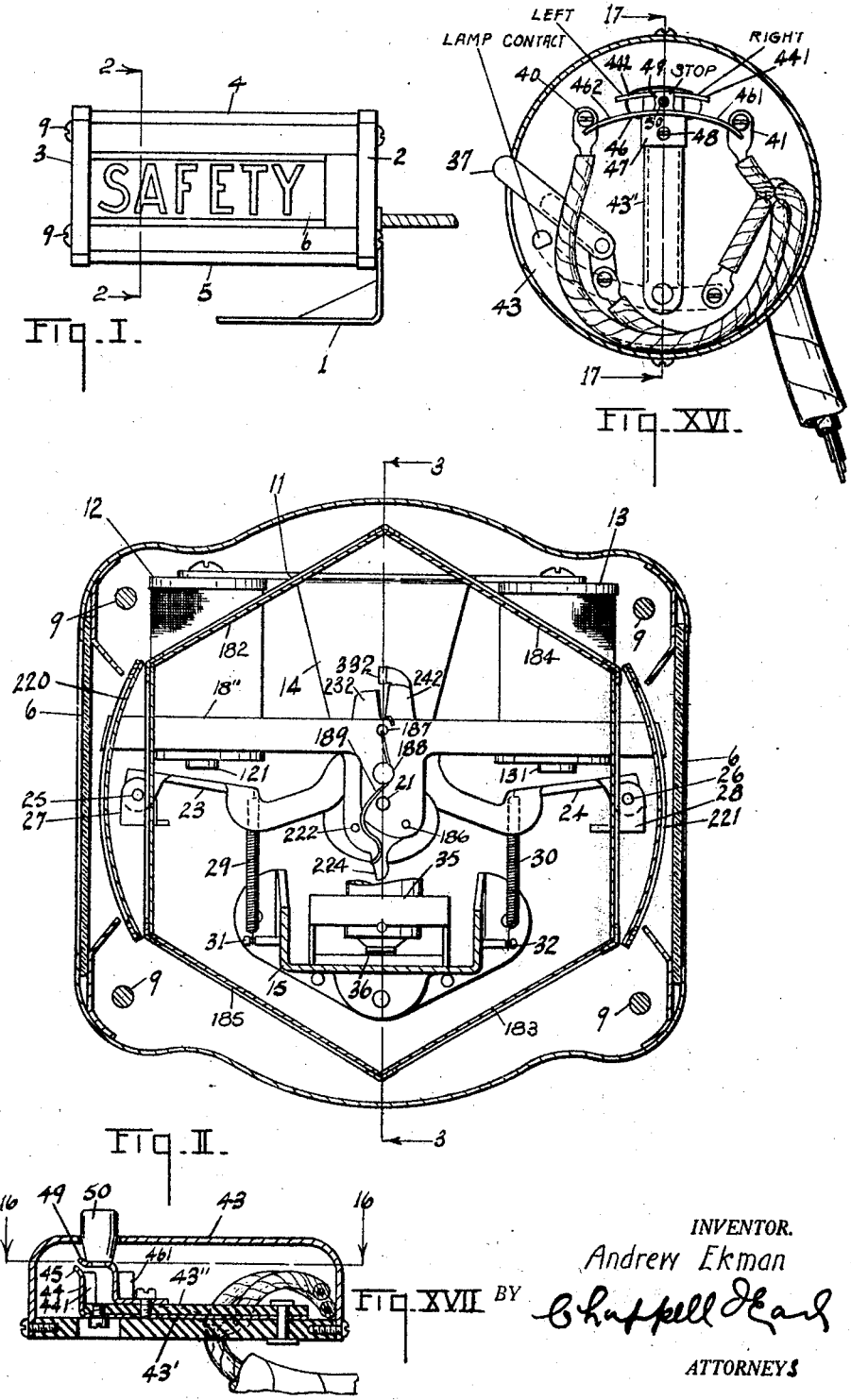

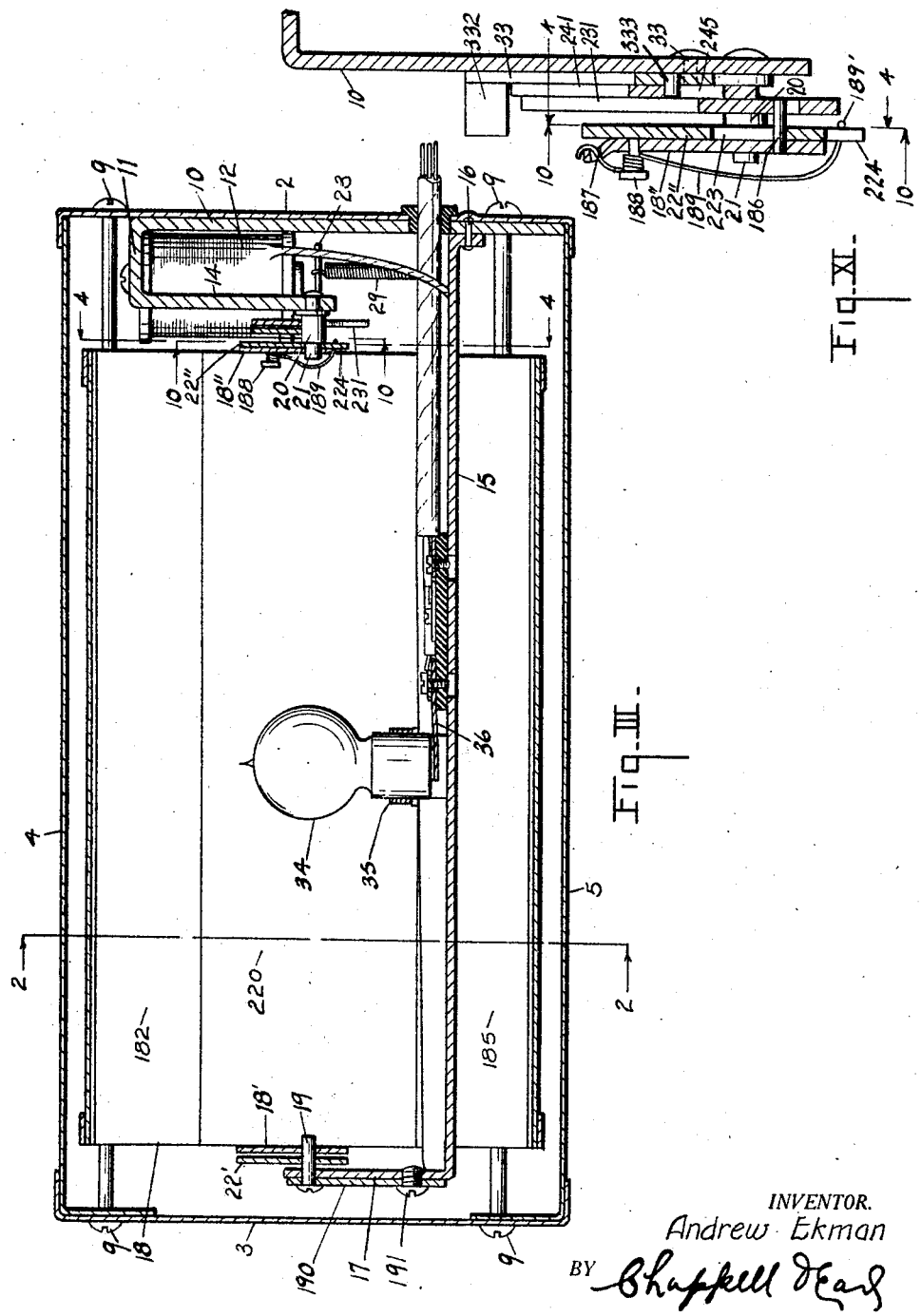

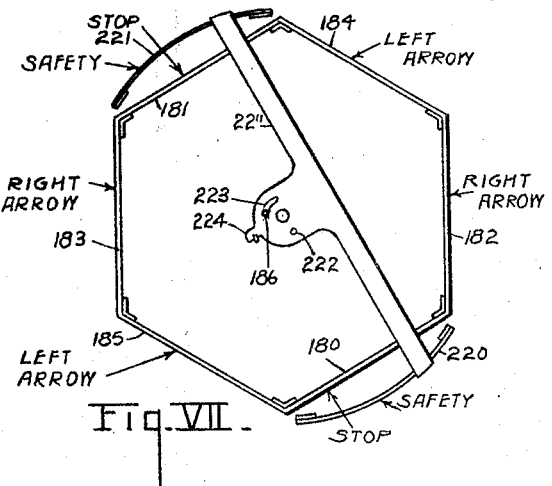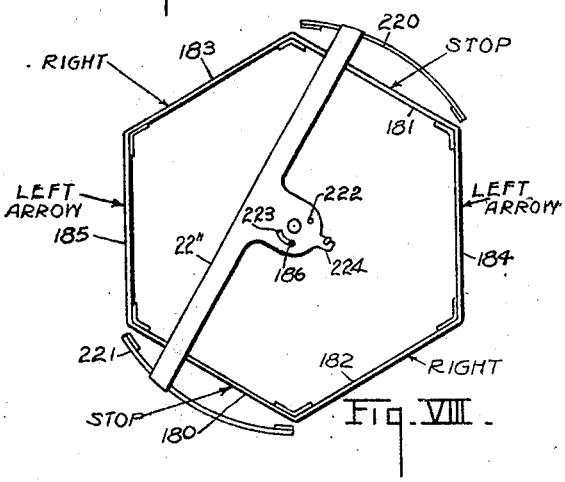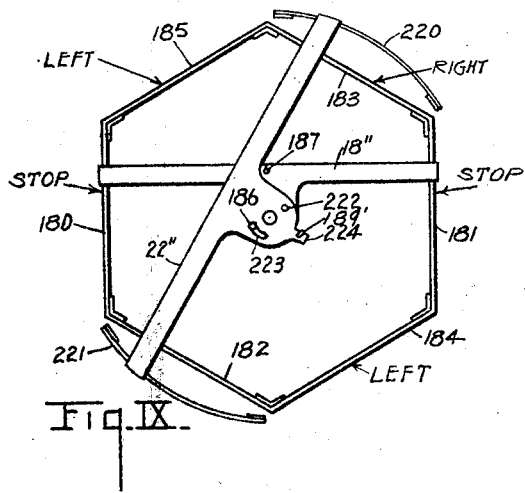

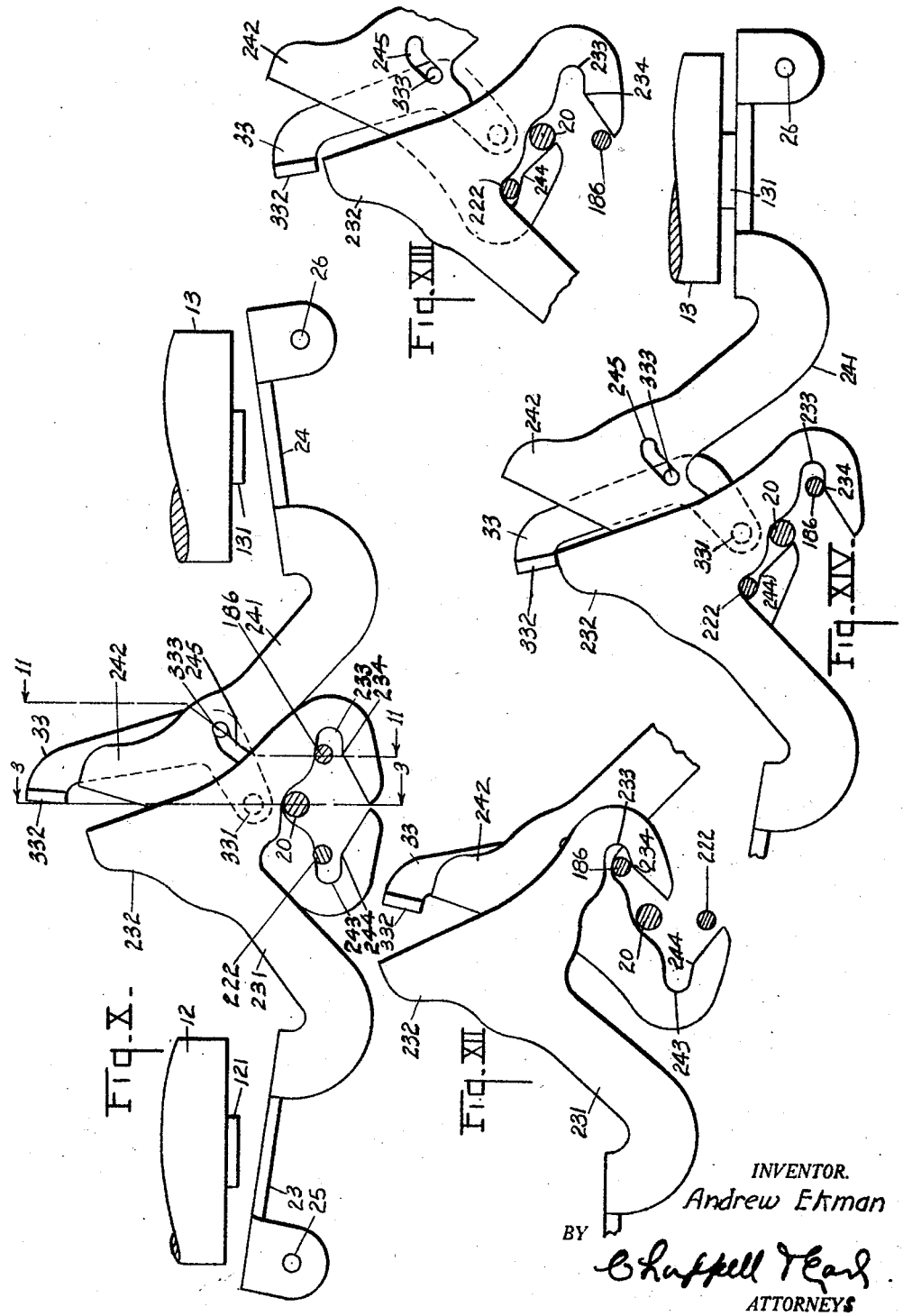

Patented Dec. 1, 1925.

1,563,614

UNITED STATES PATENT OFFICE.

ANDREW EKMAN, OF GRAND RAPIDS, MICHIGAN.

SIGNAL DEVICE.

Application filed January 20, 1922. Serial No. 530,511.

*To all whom it may concern:*

Be it known that I, ANDREW EKMAN, a subject of the King of Sweden, residing at Grand Rapids, county of Kent, State of Michigan, have invented certain new and useful Improvements in Signal Devices, of which the following is a specification.

This invention relates to improvements in signal devices for use on automobiles or vehicles generally to effectively signal the course and operation of the vehicle.

The objects of the invention are:

First, to provide in a simple and compact device effective means of signaling "Safety", "Stop", and direction of turning.

Second, to provide in such a structure an effectively illuminated sign.

Third, to provide such a structure with a single control means which can effectively signal the particular condition required without likelihood of confusion.

Fourth, to provide such a signal device with simple and effective operating means.

Fifth, to provide such a signal device and controlling means with an effective electric switch.

Further objects, and objects relating to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is fully illustrated in the accompanying drawing, forming a part of this application, in which:

Fig. I is a side elevation view of my improved signal device from the rear, showing the same at "Safety".

Fig. II is an enlarged detail cross sectional elevation view, certain parts being broken away for clearness, taken on line 2—2 of Figs. I and III.

Fig. III is a detail sectional elevation view on a line corresponding to line 3—3 of Figs. II and X.

Fig. IV is a detail sectional view on a line corresponding to line 4—4 of Figs. III and XI with the signal at "Safety".

Fig. V is a detail developed view of the signals on the signal drum.

Fig. VI is a detail perspective view of the "Safety" sign detached.

Fig. VII is an end elevation view similar to that of Fig. IV, somewhat reduced in size, showing the signal arrow pointing to the right.

Fig. VIII is a similar view with the signal arrow pointing to the left.

Fig. IX is a similar view with the signal at "Stop", the "Safety" sign having been swung to expose the same.

Fig. X is an enlarged detail elevation view of the actuating means, portions only of the electromagnets being shown, taken on line 10—10 of Figs. III and XI, when the signal stands at "Safety".

Fig. XI is an enlarged detail sectional view on the irregular line 11—11 of Fig. X.

Fig. XII is an elevation view in the same plane as Fig. X of portions thereof sufficient to show the operation of the actuating means in exposing the right-hand signal arrow.

Fig. XIII is a view similar to Fig. XII showing the position of the actuating means in exposing the left-hand signal arrow.

Fig. XIV is a similar detail view showing the position of the actuating means in the "Stop" position.

Fig. XV is a diagram showing the electric wiring and switch.

Fig. XVI is a detail sectional view substantially full size, of the switch on line 16—16 of Fig. XVII.

Fig. XVII is a detail sectional elevation on a line corresponding to line 17—17 of Fig. XVI.

In the drawing the sectional views are taken looking in the direction of the little arrows at the ends of the section lines and similar numerals of reference refer to similar parts throughout the several views.

The parts will be considered by their numerals of reference. 1 is a supporting bracket of any convenient form for attaching my signal device to a vehicle.

The case is made up of heads 2 and 3 with top 4 and bottom 5 with glazed windows 6, 6 at the front and rear. The heads 2 and 3 are retained upon the body of the case by the bolts 9. 10 is the end supporting frame disposed within the end of the case having a horizontally disposed portion 11 towards the top carrying a pair of electromagnets 12 and 13,—see Fig. II, and having a downwardly projecting portion 14 which carries the inner end of the signal drum and devices. 15 is a longitudinal channel-shaped bar (see Figs. II and III)

disposed within the lower portion of the signal drum and secured by rivets 16 to the end plate 10 and projects upwardly at 17 to form the support for the outer end of the signal drum and devices.

The signal drum 18, hexagonal in form, has a cross bar 18' at its outer end and a corresponding cross bar 18'' at its inner end. Pivot 19 is carried by the support 17 at the outer end and pivot 20 is carried by the depending portion 14 of the support 10 at the inner end. The drum 18 is thus pivotally supported on these pivots in rocking relation to the case to expose the signal signs thereon. The said pivot 19 is secured to the plate 190 which is secured on the support 17 by screw 191,—see Fig. III. The pivot 20 is reduced at 21 to form a shouldered pivotal support for the inner end bar 18'' of the said signal drum. The signal drum 18 is hexagonal in form. When in its normal position the drum has the portions 180 and 181 at the rear and front respectively bearing the word "Stop". The drum is made translucent so that it can be illuminated from the interior by devices hereafter to be described. Signal arrows pointing to the left are on the faces 182 and 183 and to the right on faces 184 and 185,—see particularly Figs. IV to IX, inclusive.

22 is the "Safety" sign comprising portions 220 and 221 carried on the cross arms 22' and 22'',—see Figs. III and VI, on the same pivots that support the drum 18. The parts 220 and 221 are disposed when in the normal position to cover the "Stop" sign and to expose the signal "Safety", both to the front and rear. The sign rocks with the signal drum when exposing the right and left signal arrows and is depressed and swung up or down, as the case may be, to expose the "Stop" signal, as appears in Fig. IX.

This actuation is accomplished by rocking the parts on the pivots 19, 21, which are controlled from the inner end. Pin 222 is fixed on the central portion of the cross bar 22'' which is broadened for the purpose. An arc-shaped slot 223 is opposite the same and an actuating pin 186 is secured to the broadened central portion of the cross bar 18'' and projects through the slot 223 and coacts therewith to permit and limit the relative movement and position of the signal drum and the "Safety" signal,—see particularly Figs. IV, VII ,VIII and IX.

When the "Safety" signal is actuated, as in Fig. IX, it swings relatively to the signal drum and the upper end of the slot contacts against the pin 186 limiting the movement thereof. The parts are held yieldingly in the initial relation seen in Figs. II and IV by the spring 189, which is coiled on the pin 188 fixed on the central portion of the cross bar 18'' and engaged in the hole 187 at its upper end and extended below the lower most portion of the said cross bar and engaged at 189' around the downwardly projecting lug 224.

By this arrangement, the spring 189 holds the parts yieldingly in such position that the "Stop" pin 186 is at the bottom of the slot 223, as seen in Fig. IV. It will be seen, therefore, that if pin 186 is locked against movement and the pin 222 is raised upwardly it will rotate the "Safety" sign independently until the top of the slot 223 engages the pin 186, as seen in Fig. IX.

Actuators 23, 24 are pivoted at 25, 26,— see Figs. II and X. The said actuators constitute armatures acted upon by the projecting cores 121 and 131 of the respective magnets 12 and 13. Broad brackets 27 and 28, secured to the plate 10 in any suitable way, are provided for the said pivotal connections. Extension coiled springs 29 and 30 engage the actuators 23 and 24 respectively and are connected to projecting pins 31, 32 on the sides of the supporting channel bar 15,—see Fig. II, to insure prompt return of the parts after actuation.

The actuators 23, 24 are symmetrical and opposed and are provided with oppositely disposed corresponding arms 231 and 241 having upwardly projecting portions 232 and 242 respectively. The actuators terminate in engaging hooks 233 and 243 of slightly larger dimension than the pins 186 and 222, which they respectively engage. These have engaging portions 234 and 244 to engage the said pins, either for actuation or locking of the same, which action will be explained later on.

An auxiliary lock latch 33 is pivoted at 331 to the downwardly depending portion 14, such pivot being directly above the main supporting pivot 20 and parallel therewith. This latch 33 is provided with an engaging lug 332,—see Figs. X and XI, to engage above the upwardly projecting portion 232 of the actuator 23. This latch is provided with a pin 333 and it is actuated by a slot 245 in the actuator 24, the slot being disposed at such an angle that it throws the latch to the left as indicated in Fig. X to engage the upwardly projecting portion 232 for the purpose of locking the same when the engaging portion 244 of its hook is in engagement with the pin 222.

When actuator 23 is pulled up as indicated in Fig. XII the engaging portion 234 of its hook engages underneath pin 186 and the indicator drum and also the "Safety" signal, turning as one piece, swing to the position indicated in Fig. VII, exposing the arrow pointing to the right.

When actuator 24 is operated the engaging portion 244 of its hook engages pin 222 turning the indicator drum and the "Safety"

sign as a unit and exposes the arrow pointing to the left, as indicated in Fig. VIII. The position of the actuating parts clearly appears in Fig. XIII, the latch 33 being swung above the projecting part 232 but not in engagement therewith.

When both actuators 23 and 24 are operated simultaneously the engaging portion 234 of actuator 233 contacts with pin 186 simultaneously with the engagement of the pin 222 by the engaging portion 244 of actuator 24. The upward movement of actuator 24, however, swings the latch 33 so that its lug 332 engages above the upwardly projecting portion 232 and locks the same against further movement. Because the pin 186 is thus engaged the signal drum is held against rotation and because the actuator 24 is free to move, it, through its engaging portion 244, acting upon the pin 222, turns the "Safety" sign 22 to the position indicated in Fig. IX displaying the "Stop" signal. The movements of the actuators separately or together, thus completely actuates the signal device.

Actuator 23 is operated by electromagnet 12 and actuator 24 is operated by electromagnet 13, so that by exciting one or the other magnet the right or the left-hand signal is shown and, by operating both magnets together, the "Stop" signal is shown.

The circuits for doing this are indicated by the wiring diagram in Fig. XV in which 42 is the supply current delivering through the switch 43 to the circuits 38 and 39 through the terminals 40, 41, alternately or simultaneously for the proper actuation of the signals.

On the channel bar 15 is disposed an electric light 34 in a socket 35 connected with the circuit 36 for illuminating the interior of the drum and thus very effectively exhibiting the signals at night, although the same is of assistance in the daytime.

The details of the switch appear in Figs. XVI and XVII. The pivoted switch arm is provided with an electric connection 43' having an upwardly projecting portion 44 terminating in a contact part 45. A contact piece 46 is supported by an offset portion 47 retained upon the top side of the switch arm by the screw 48 on the insulator bar 43'' in insulated relation from the other portion of the switch arm. This is provided with lateral extensions 461 and 462 for engagement with the terminals 40 and 41 either alternately or simultaneously.

The upwardly projecting portion 44 of the main switch connection is provided with lateral extensions 441 and 442 to cooperate with the other portions of the switch. An insulated switch button or handle 50 is provided for manipulating the switch and also serves as a push button to close the circuits when in central position to indicate "Stop".

The electric light circuit 36 is provided with a switch 37 which, through suitable connections, supplies the lamp 36 through its socket 35, as seen in Fig. III. From the description of the switch members its operation will be very clear.

When the switch is in the position indicated in Figs. XVI and XVII if the handle 50 is pushed it will force the projecting portion 49 into contact with the upwardly projecting portion 44 and close the circuit and deliver current to both terminals 40 and 41, thus actuating the electromagnets, which causes their simultaneous operation, throwing the actuators to the position indicated in Fig. XIV and exposing the "Stop" signal, as indicated in Fig. IX. By merely swinging the switch arm to the right by taking hold of the handle 50 and not unduly pressing it the projecting portion 441 will be brought into contact with the terminal 41 and close the circuit at that side, and the movement of the switch arm to the right will have carried the contact portion 462 out of contact with the terminal 40. A movement to the left of Fig. XVI will deliver current to the terminal 40 because the projection 442 will be brought into contact therewith and the projection 461 will have been disconnected from the terminal 41, so that it will be seen that a very simple manipulation of the switch comprising, first, a pushing of the button to indicate the "Stop" or the swinging to the right or the left to indicate the direction of travel is all that is required.

While I have provided a particular means for opening and closing the various circuits I desire to state that this may be accomplished in various ways. Separate switches or push buttons might be used for each, but I prefer to bring the same into a single switch structure in which but one lever and button will require manipulation, so that one only of the signals will be given, and that the required one, by simple manipulation.

Having thus described my invention, what I claim as new and desire to secure by Letters Patent, is:

1. In an automobile signal device, the combination of a suitable casing with a window front and rear, a supporting frame at one end thereof, a supporting arm secured to the said frame and disposed longitudinally within the said casing, a translucent signal drum with "Stop" signs front and rear and with direction arrows on the upper and lower parts, cross bars at each end thereof and pivotal supports on the said frame and arm, a projecting actuating and stop pin on the inner cross bar, an electric lamp disposed upon the supporting arm within the said drum, a safety sign with display surface front and rear with end cross arms disposed on said pivots, the inner end arm having an arc-shaped slot embracing the said projecting pin on the drum cross arm, a projecting actuating pin on said safety sign cross arm, a spring holding the said drum and safety sign yieldingly together in the initial position with the stop pin at one end of said slot, lever actuators fulcrumed at opposite sides of the said frame, with springs to hold the same yieldingly in position and with hook portions having clearance and one side of each disposed to rest on said pins to hold the sign yieldingly in initial safety position and with engaging portions on the opposite side of each to engage the said pins and actuate the same in one direction only, each engaging portion being spaced to give said clearance and permit the movement of said pins when not acted upon by its actuator, a stop latch pivoted to the said frame with pin and slot connections to one of said actuators and with its stop portion adapted to engage the opposite actuator with its hook engaged on its pin when both are actuated simultaneously, and means for actuating either or both of said actuator arms.

2. In an automobile signal device, the combination of a supporting end frame, a supporting arm secured to the said frame and disposed longitudinally, a translucent signal drum embracing said arm with "Stop" signs front and rear and with direction arrows on the upper and lower parts, cross bars at each end thereof and pivotal supports on the said frame and arm, a projecting actuating and stop pin on the inner cross bar, an electric lamp disposed upon the supporting arm within the said drum, a safety sign with display surface front and rear with end cross arms disposed on said pivots, the inner end arm having an arc-shaped slot embracing the said projecting pin on the drum cross arm, a projecting actuating pin on said safety sign cross arm, a spring holding the said drum and safety sign yieldingly together in the initial position with the stop pin at one end of said slot, lever actuators fulcrumed at opposite sides of the said frame, with springs to hold the same yieldingly in position and with hook portions having clearance and one side of each disposed to rest on said pins to hold the sign yieldingly in initial safety position and with engaging portions on the opposite side of each to engage the said pins and actuate the same in one direction only, each engaging portion being spaced to give clearance and permit the movement of said pins when not acted upon by its actuator, a stop latch pivoted to the said frame with pin and slot connections to one of said actuators and with its stop portion adapted to engage the opposite actuator with its hook engaged on its pin when both are actuated simultaneously, and means for actuating either or both of said actuator arms.

3. In an automobile signal device, the combination of a suitable casing with a window front and rear, a supporting frame at one end thereof, a supporting arm secured to the said frame and disposed longitudinally within the said casing, a signal drum with "Stop" signs front and rear and with direction arrows on the upper and lower parts, cross bars at each end thereof and pivotal supports on the said frame and arm, a projecting actuating end stop pin on the inner cross bar, a safety sign with display surface front and rear with end cross arms disposed on said pivots, the inner end arm having an arc-shaped slot embracing the said projecting pin on the drum cross arm, a projecting actuating pin on said safety sign cross arm, a spring holding the said drum and safety sign yieldingly together in the initial position with the stop pin at one end of said slot, lever actuators fulcrumed at opposite sides of the said frame with springs to hold the same yieldingly in position and with hook portions having clearance and one side of each disposed to rest on said pins to hold the sign yieldingly in initial safety position and with engaging portions on the opposite side of each to engage the said pins and actuate the same in one direction only, each engaging portion being spaced to give said clearance and permit the movement of said pins when not acted upon by its actuator, a stop latch pivoted to the said frame with pin and slot connections to one of said actuators and with its stop portion adapted to engage the opposite actuator with its hook portion engaged on its pin when both are actuated simultaneously, and means for actuating either or both of said actuator arms.

4. In an automobile signal device, the combination of a supporting end frame, a supporting arm secured to the said frame and disposed longitudinally, a signal drum embracing said arm with "Stop" signs front and rear and with direction arrows on the upper and lower parts, cross bars at each end thereof and pivotal supports on the said frame and arm, a projecting actuating and stop pin on the inner cross bar, a safety sign with display surface front and rear with end cross arms disposed on said pivots, the inner end cross arm having an arc-shaped slot embracing the said projecting pin on the drum cross arm, a projecting actuating pin on said safety sign cross arm, a spring holding the said drum and safety sign yieldingly together in the initial position with the stop pin at one end of said slot, lever actuators fucrumed at opposite sides of the said frame with springs to hold the same yieldingly in position and with hook portions having clearance and one side of each disposed to rest on said pins to hold the sign yieldingly in initial safety position and with engaging portions on the opposite side of each to engage the said pins and actuate the same in one direction only, each engaging portion being spaced to give said clearance and permit the movement of said pins when not acted upon by its actuator, a stop latch pivoted to the said frame with pin and slot connections to one of said actuators and with its stop portion adapted to engage the opposite actuator with its hook engaged on its pin when both are actuated simultaneously.

5. In an automobile signal device, the combination of a supporting end frame, a supporting arm secured to the said frame and disposed longitudinally, a signal drum embracing said arm with "Stop" signs front and rear and with direction arrows on the upper and lower parts, cross bars at each end thereof and pivoted supports on the said frame and arm, a projecting actuating and stop pin on the inner cross bar, a safety sign with display surface front and rear with end cross arms disposed on said pivots, the inner end cross arm having an arc-shaped slot embracing the said projecting pin on the drum cross arm, a projecting actuating pin on said safety sign cross arm, a spring holding the said drum and safely sign yieldingly together in the initial position with the stop pin at one end of said slot, means to act upon the said pins to rock the combined signal drum and safety sign up and down to indicate direction, stop means to hold the said signal drum, and actuating means to rock the safety sign to expose the stop sign, as specified.

6. In an automobile signal device, the combination of a supporting frame, a supporting arm secured to the said frame and disposed longitudinally, a translucent drum embracing said arm with "Stop" signs front and rear and with direction arrows on the upper and lower parts, cross bars at each end thereof and pivoted supports on the said frame and arm, a projecting actuating and stop pin on the inner cross bar, an electric lamp disposed upon said supporting arm within the said drum, a safety sign with display surface front and rear with end cross arms disposed on said pivots, the inner end cross arm having an arc-shaped slot embracing the said projecting pin on the drum cross arm, a projecting actuating pin on said safety sign cross arm, a spring holding the said drum and safety sign yieldingly together in the initial position with the stop pin at one end of said slot, means to act upon the said pins to rock the combined signal drum and safety sign up and down to indicate direction, stop means to hold the said signal drum, and actuating means to rock the safety sign to expose the stop sign, as specified.

7. In an automobile signal device, the combination of a suitable pivoted main sign support with "Stop" and direction signs disposed thereon for separate exposure, a pivoted safety sign disposed to cover the stop signal part, yielding means between said safety sign and main sign to hold them yieldingly in the relative initial position, projecting pins secured to said signs for actuating the same, a lever actuator fulcrumed at each side of said sign for each pin and its supports, with springs to hold the same yielding in position and with hook portions having clearance and one side of each disposed to rest on said pins to hold the sign yieldingly in initial safety position and with engaging portions on the opposite side of each to engage the said pins and actuate the same in one direction only, each engaging portion being spaced to give said clearance and permit the movement of said pins when not acted upon by its actuator, and a stop latch pivoted to the said support with pin and slot connections to one of said actuators and with its stop portion adapted to engage the opposite actuator to stop it with its hook engaged on its pin when both are actuated simultaneously.

In witness whereof, I have hereunto set my hand and seal.

ANDREW EKMAN. [L. S.]